United States Patent [19]
Edwards

[11] Patent Number: 5,362,084
[45] Date of Patent: Nov. 8, 1994

[54] CABLE CARRIER FOR VEHICLE HITCH

[76] Inventor: Jerry A. Edwards, 140 SE. 99th, Portland, Oreg. 97216

[21] Appl. No.: 27,457

[22] Filed: Mar. 8, 1993

[51] Int. Cl.5 .............................................. B60D 1/28
[52] U.S. Cl. ................... 280/457; 280/480; 280/504; 280/432
[58] Field of Search ..................... 280/504, 416.1, 432, 280/457, 480, 458

[56] References Cited

U.S. PATENT DOCUMENTS

| | | | |
|---|---|---|---|
| 2,478,184 | 8/1949 | Elliott | 280/480 |
| 2,835,510 | 5/1958 | Schoneberg | 280/504 |
| 3,072,419 | 1/1963 | Safford | 280/457 |
| 3,153,832 | 10/1964 | Shumway | 280/504 |
| 3,649,049 | 3/1972 | Woodke, III | 280/457 X |
| 4,368,899 | 1/1983 | Smalley et al. | 280/504 X |
| 5,039,272 | 8/1991 | Holmes et al. | 280/457 X |

Primary Examiner—Margaret A. Focarino
Assistant Examiner—Carla Mattix
Attorney, Agent, or Firm—Robert L. Harrington

[57] ABSTRACT

A carrier for supporting flexible couplings interconnected between a towing vehicle and a towed vehicle such as safety cables, safety chains and electrical cable. The carrier is mounted on the hitch of the towing vehicle with configured formations extending laterally from the hitch. The formations support and carry the flexible couplings at a distance from the union of the hitches of the towing and towed vehicle. The carrier prevents the flexible couplings from damage by preventing the flexible couplings from becoming entrapped between the hitch bottom and the ground and by maintaining the flexible couplings at a distance from the union of the hitches of the towing and towed vehicle.

6 Claims, 3 Drawing Sheets

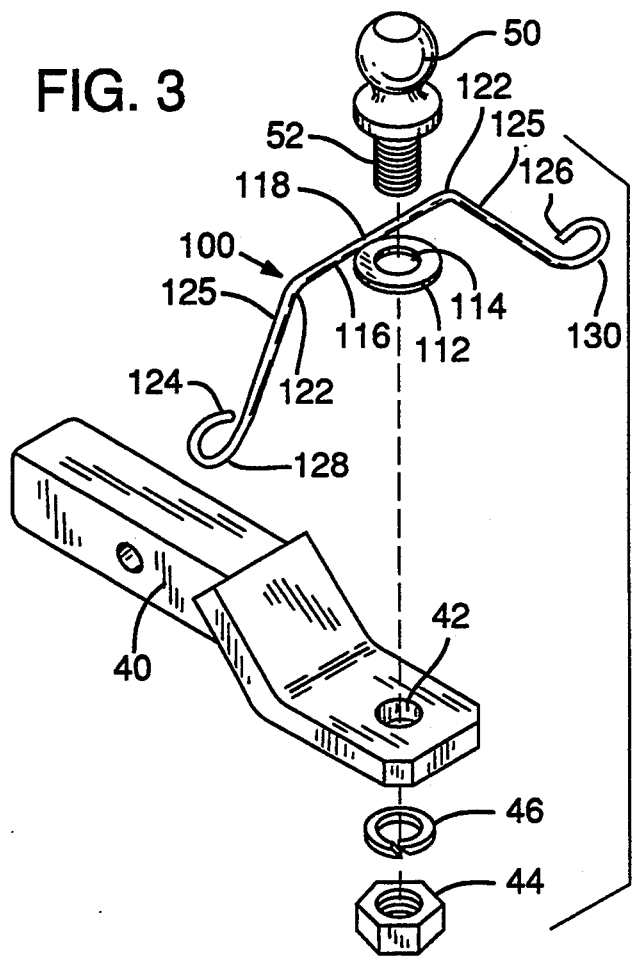
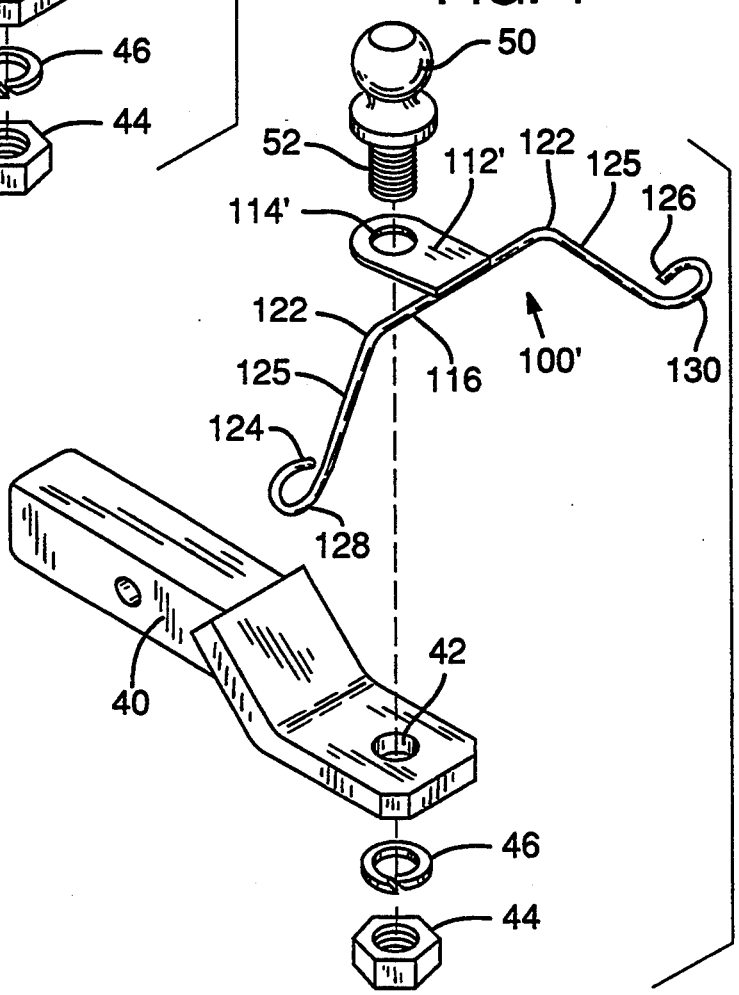

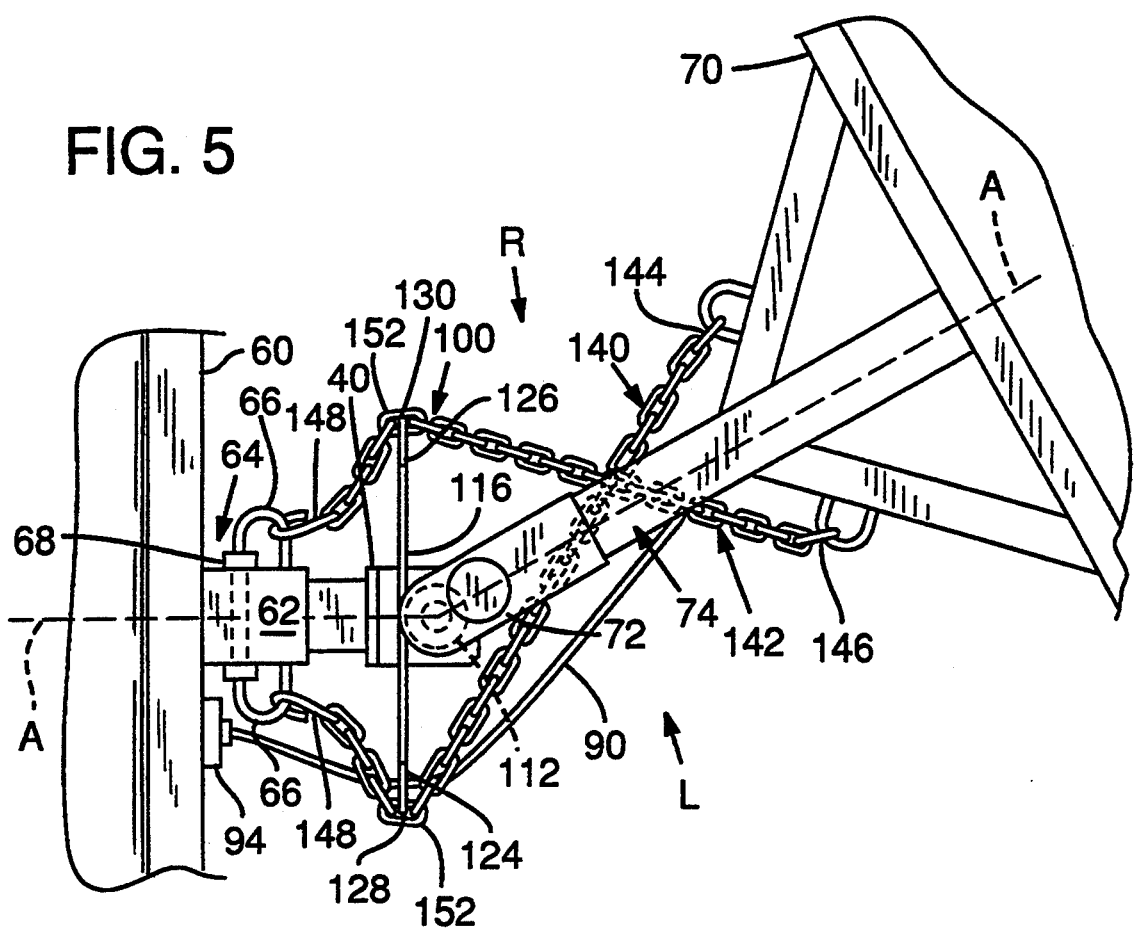

CABLE CARRIER FOR VEHICLE HITCH

BACKGROUND OF THE INVENTION

1. Field of the Invention

This invention relates to hitches for vehicles and more particularly relates to a carrier provided for supporting flexible couplings interconnected between a towing vehicle and a towed vehicle.

2. Background Information

Vehicles, such as pickup trucks and the like are provided with hitches so that they may tow another vehicle, such as a trailer. A typical hitch arrangement is the receiver type hitch. The receiver type hitch includes suitable framework mounted to the frame of the pickup and has a center sleeve arranged to receive a variety of hitch adapters. A hitch adapter is mounted in the sleeve and is retained by a retaining pin. A ball is typically secured to the adapter and a trailer to be towed has a coupler on the end of its hitch suited to be secured to the ball. When secured to the ball, the coupler is permitted to pivot on the ball as the vehicles make turns, traverse over uneven terrain and the like.

Safety chains or cables are provided as safety devices on the hitch of the trailer with one chain (cable) fixedly attached to one side of the trailer hitch and another chain (cable) fixedly attached to the other side of the trailer hitch. The opposite ends of the chains (cables) are removably connected to the pickup hitch when the pickup and trailer are hitched together. It is generally recommended that the safety chains (cables) be criss-crossed below the trailer hitch when connecting the safety chains (cables) to the pickup. Thus the chain (cable) fixedly attached to the right side of the trailer hitch will be crossed under the trailer hitch and removably attached to the left of the pickup hitch. Similarly the chain (cable) fixedly attached to the left side of the trailer hitch will be crossed under the trailer hitch and will be removably attached to the right of the pickup hitch. The safety chains (cables) criss-crossed under the trailer hitch will prevent the end of the trailer hitch (coupler) from digging into the ground in the event the hitches of the pickup and the trailer become detached from each other.

The trailer most often has tail, turn and brake lights that are powered by the pickup. An electrical cable is provided on the trailer that is connectable to a receptacle on the pickup to provide power to the light system of the trailer. The receptacle is most often at a position above the hitch of the pickup and may be positioned to the left of, to the right of or directly above the hitch of the pickup.

The safety chains (cables) and the electrical cables are flexible couplings interconnected between the pickup and the trailer. The flexible couplings are not connected between the pickup and trailer in a taut condition so that they will not interfere with the pivotal connection between the hitches of the pickup and the trailer as the vehicles turn or traverse over uneven terrain. The flexible couplings thus generally are in a drooped condition.

One of the problems encountered is that the flexible couplings, whether they are the safety type or electrical, can become damaged. The safety couplings, being drooped under the hitches, may be damaged as a result of the couplings being caught between the underside of hitch and the ground on the occasion when the hitch bottoms out, that is when the hitch strikes the ground. The electrical coupling, which most often is above the hitch may become entangled between the coupler of the trailer hitch and the ball and/or the adapter of the pickup hitch.

BRIEF SUMMARY OF THE INVENTION

The present invention is a carrier mounted on the hitch of the towing vehicle for supporting and carrying the flexible couplings, such as safety cables, safety chains, electrical cables and the like that are interconnected between a towing vehicle and a towed vehicle.

The carrier described and illustrated in a preferred embodiment has a base arranged to be mounted under a ball of a towing vehicle hitch. A support member fixedly attached to the base extends on each side of the hitch with the ends of the support member formed into helical formations. The helical formation permits lateral insertion of the flexible couplings. The ends of the support member, with the cables received therein prevent the couplings from encountering the area of connection of the hitches of the towing and towed vehicle and prevent the couplings from being entrapped between the hitch bottom and the ground.

The helical formations are sufficiently large to permit the couplings to slide within the formations and thus will not bind nor hinder the function of the coupling.

Other objects and advantages will be realized from the drawings and the detailed description.

BRIEF DESCRIPTION OF THE DRAWINGS

FIG. 3 is view of another embodiment of the carrier of the present invention; and FIG. 4 is a view showing an alternate base for the carriers of FIGS. 1 and 3.

FIG. 5 illustrates safety chains attached to the hitch arrangement.

DESCRIPTION OF THE PREFERRED EMBODIMENT

Figure 1:
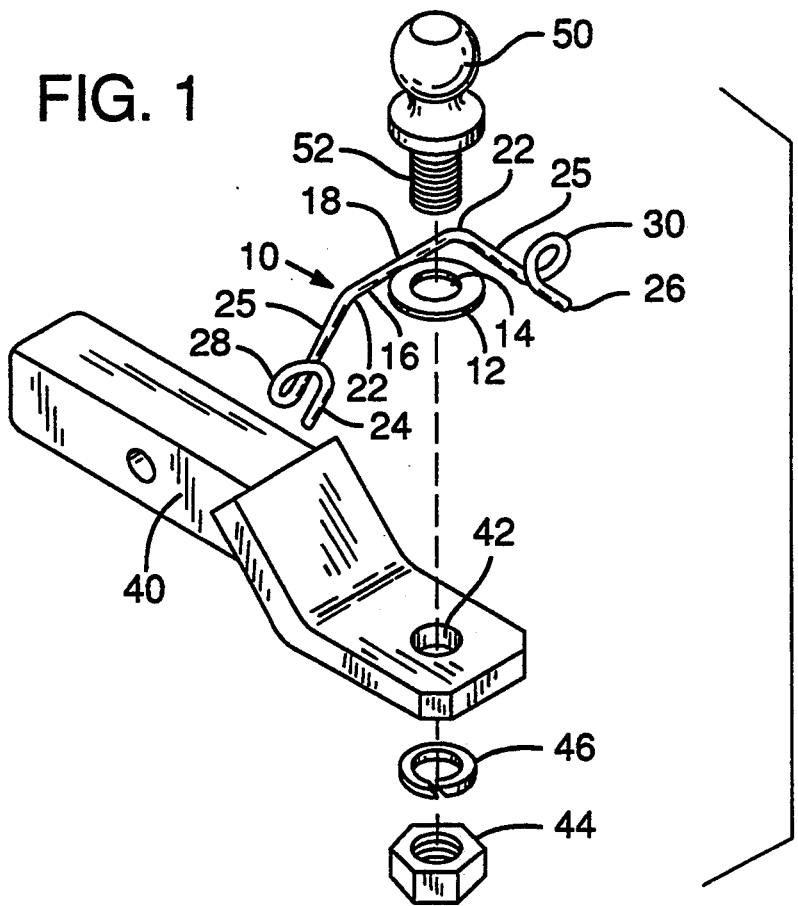
FIG. 1 is an exploded perspective view of a carrier of the present invention shown in relation to a ball and hitch adapter.

Refer now to FIG. 1 of the drawings which is an exploded view of a carrier 10 of the present invention shown in relation to a hitch adapter 40 and a ball 50. The carrier 10 has a base 12 configured to be mounted on a hitch, and in this embodiment the base 12 is in the form of a circular washer. The base 12 has a center aperture (hole) 14. As illustrated, a support member, such as a carrier rod 16, is fixedly mounted near or at its midpoint 18 to the base 12 as by welding. It is apparent that other geometric shapes may be utilized for the carrier rod 16. A round rod is selected for the carrier rod 16 since it is easily formed, is readily attached to the base 12 and as will be later seen, the circular section of the rod 16 does not impede movement of articles carried by the carrier. As shown, the carrier rod 16 extends in a generally symmetrical manner from the mounting point 18, the rod 16 being bent downward (as viewed in the figure) at each of the positions 22, the portion of the rod 16 extending downward from the positions 22 being indicated generally by the numeral 25. Helical formations (modified spirals) 28, 30 are provided near ends 24, 26 of the rod 16 as by bending. It is preferable to have a left hand helix of at least one turn, generally indicated by 28, formed near end 24 and a right hand helix of at least one turn, generally indicated by 30, formed near end 26 with the ends 24, 26 of the rod 16 extending generally in a tangential manner from the helical formations 28, 30 and basically parallel to the downward extending portions 25.

The carrier 10 and the ball 50 are mounted on the hitch adapter 40 with the base 12 of the carrier 10 under the ball 50. The ball 50 has a stud 52 that extends through the hole 14 of the carrier 10 and the bore 42 of the adapter 40. A nut 44 and lock washer 46 fitted to the end of the stud 52 fixedly secures the ball 50 and carrier 10 to the adapter 40 in a conventional manner. The combination of the ball 50, stud 52, washer 46 and nut 44 serve as a fastener to mount (attach) and secure the carrier 10 to the hitch adapter 40.

Figure 2:
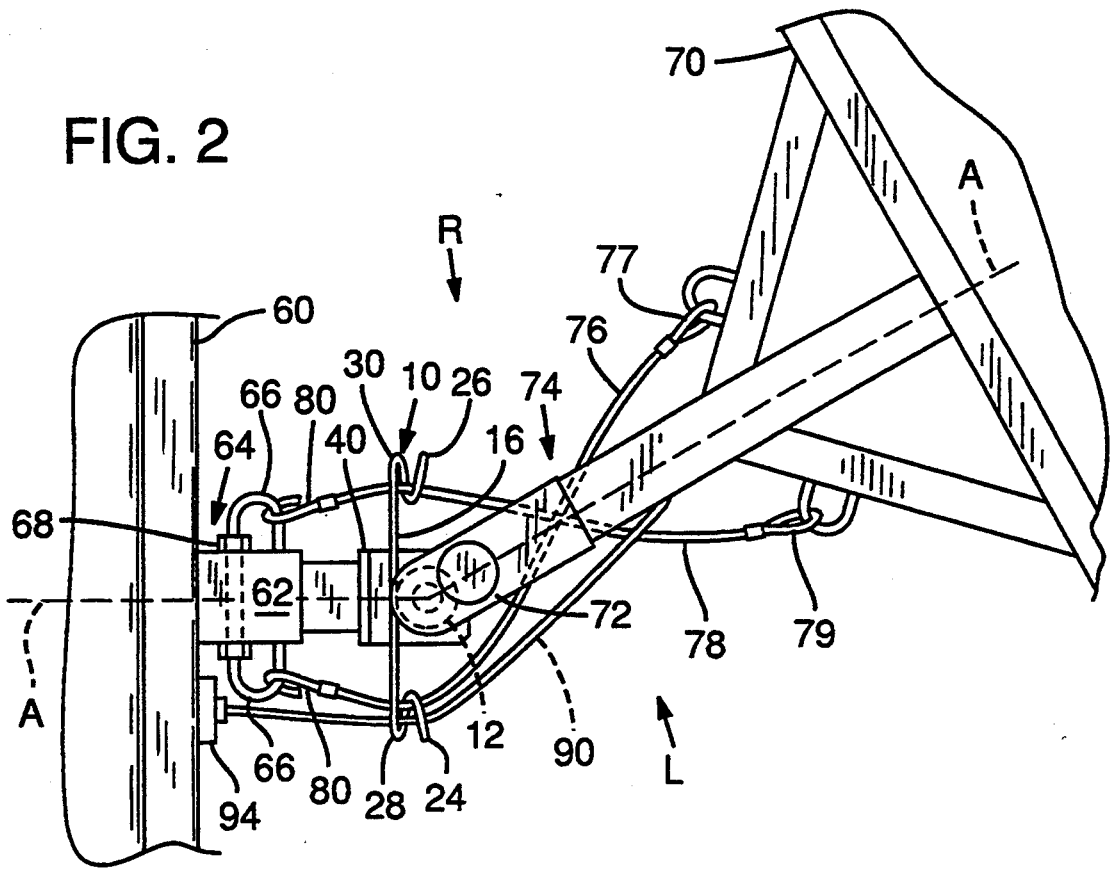
FIG. 2 is a top view of a hitch arrangement as between a towing and towed vehicle with the carrier of the present invention mounted to the hitch of the towing vehicle.

Refer now to FIG. 2 of the drawings which illustrates the hitch portions only of a towing vehicle, such as a pickup truck 60 and a towed vehicle, such as a trailer 70 coupled together with the carrier 10 of the present invention mounted on the hitch of the truck 60. A hitch adapter 40 has been installed in a sleeve 62 of a receiver hitch 64 of the truck 60 with the adapter being retained in the sleeve 62 by a pin 68. The hitch adapter 40 installed in the sleeve 62 of the hitch 64 in effect becomes part of the hitch 64 and the combination may hereafter be simply referred to as hitch 64. A ball 50 (out of view) and carrier 10 are mounted on the adapter 40 in the manner previously described. The carrier 10 is mounted on the hitch 64 with the ends 24, 26 and thus the formations 28, 30 being extended at a lateral distance from the hitch. A coupler 72 of the trailer hitch 74 is mounted on the ball 50 in a known conventional manner to couple the trailer 70 to the pickup 60. FIG. 2 is a top view and in viewing the drawing, the components (as viewed in the figure) that are above the hitch axis designated as A are on the right side off the vehicle and trailer, the right side being generally designated by the letter R and the components (again as viewed in the figure) that are below the axis A are on the left side, the left side being generally designated by the letter L. Safety cables 76, 78 are provided on the hitch 74 with an end 77 of one cable 76 being fixedly attached to the right side of the hitch and with an end 79 of cable 78 being fixedly attached to the left side of the hitch. Hooks 80 are provided on the free ends of the cables 76, 78 to facilitate the removable fastening of the cables to the hitch 64. In this embodiment, the hooks 80 engage a safety loop 66 on the left and right side of the hitch 64. As shown in FIG. 2, the right hand cable 76 is crossed under the hitch 74 and is inserted in the helical formation 28 on the left side of the carrier 10. The helix angle of the helical formation 28 (and of 30) is sufficiently large such that the distance between successive turns of the helical formation 28 permits the cable 76 to be inserted laterally from the side of the formation 28. In effect, the cable 76 is carried (supported) within the helical formation 28. The hook 80 on the end of the cable 76 is connected to the safety loop 66 on the left side of the hitch 64. Similarly, cable 78 is crossed under the hitch 74 with the cable 78 being inserted in the formation 30 of the carrier 10 with the hook 80 being connected to the safety loop 66 on the right side of the hitch 64. The formations 28, 30 are sufficiently large in diameter to permit the cables 76, 78 to freely slide in the formations even with another flexible coupling inserted in the same formation. As seen in FIG. 2, formation 28 receives cable 76 and the electrical cable 90. The electrical cable 90 is removably connected to the pickup 60 by a known receptacle 94.

As is known, the cables 76, 78 are not attached in a taut condition so as not to impede or interfere with the pivotal movement as between the hitches 64 and 74. The cables 76, 78 are thus attached with sufficient slack to permit the pickup 60 and trailer 70 to negotiate the sharpest corner without the cables 76, 78 becoming tightened. Similarly electrical cable 90 is attached with sufficient slack so that the cable 90 will not become detached from the receptacle 94.

The safety cables 76, 78 and the electrical cable 90 received in formations 28, 30 are kept clear of the union between hitch 64 of the pickup and the hitch 74 of the trailer. Cable 90 is shown in the figure as being received in formation 28. The cable may also be received in formation 30. The carrier 10 thus supports and maintains the safety cables 76, 78 and the electrical cable 90 at a distance from the union between the hitch 64 of the pickup and the hitch 74 of the trailer.

Refer now to FIG. 3 of the drawings which illustrates a carrier 100 for supporting safety chains. The carrier 100 has a rod 116 fixedly attached to a base 112 as by welding. As shown, the rod 116 is fixedly attached near or at its mid point 118 and extends in a generally symmetrical manner from the base 112. The rod 116 is bent downward (as viewed in the figure) at points 122 and has a portion 125 extending to each of the ends 124 and 126. A loop formation 128 is formed near end 124 as by bending and a similar loop formation 130 is formed near end 126. The carrier 100 is mounted on the adapter 40 in the same manner as carrier 10.

FIG. 4 illustrates a variation of the base for the carriers of the present invention. The base 112' is flat plate fixedly attached to the rod 116 as by welding. An aperture 114' (hole) is provided in the base 112' to facilitate mounting the carrier 100' to the adapter 40. The base 112' may be readily attached to the rod 16 of the carrier 10 illustrated in FIG. 1 in place of the base 12.

FIG. 5 illustrates safety chains 140, 142 (the chains 140, 142 have interconnecting links 152) fixedly attached to the hitch 74 instead of the safety cables 76, 78. The carrier 100 is mounted on the adapter 40 with the looped ends 128, 130 being extended laterally from the hitch 64. One end 144 of the safety chain 140 is fixedly attached to the right side of the hitch 74 and one end 146 of safety chain 142 is fixedly attached to the left side of the hitch 74. Hooks 148 are provided on the free ends of the safety chains 140, 142. The chains 140, 142 are criss-crossed under the hitch 74 with the hook 148 of the chain 142 being removably attached to the safety loop 66 on the right side of the hitch and the hook 148 of the chain 140 being removably attached to the safety loop 66 on the left side of the hitch 64. A link 152 of chain 142 is hooked on the loop 130 of the carrier 100 and a link 152 of the chain 140 is hooked on the loop 128 of the carrier 100. The electrical cable 90 is fitted in the loop 128. The chains 140, 142 are thus coupled to the hitch 64 and are carried (supported) at a distance from the union between the hitch 64 and the hitch 74.

It will be apparent to those skilled in the art that modifications and variations may be made without departing from the true spirit and scope of the invention. The invention is not to be limited to the illustrated and described embodiments but is to be determined by the appended claims.

What is claimed is:

1. A carrier mountable on a hitch of a vehicle having front and rear ends and opposed sides, for supporting an elongated flexible coupling having opposite ends connected to a towing and towed vehicle, respectively, said hitch providing pivotal connection between the towing and towed vehicle, and said opposite ends of the flexible coupling crossing from one side of the towing vehicle to an opposite side of the towed vehicle whereby the coupling can cross past the pivotal connection, said carrier comprising:

a base, said base mountable on said hitch at said pivotal connection;

a support member fixedly attached to said base;

an end of said support member laterally extended at a distance from said base and from said pivotal connection of said hitch and not substantially forward or rearward of said pivotal connection; and a formation formed near said end of said support member for supporting said flexible coupling and retaining said flexible coupling at a lateral distance from the pivotal connection of said hitch whereby the coupling is crossed under or over said hitch and through said formation so that the crossing occurs substantially rearward or forward of the pivotal connection.

2. A carrier as defined in claim 1 wherein said coupling is a cable:

said formation being helical in configuration and defining an encircled opening through which the elongated coupling is free to slide, said cable being laterally insertable into the helical formation while the opposite ends of the coupling are both secured to the towing and towed vehicle, respectively.

3. A carrier as defined in claim 1, wherein said flexible coupling is a chain of interconnected links:

said formation is an open sided loop and selected links of said chain are hooked onto the loops.

4. In a combination towing vehicle and towed vehicle, a hitch adapter secured to the towing vehicle and a stud receiving opening provided in the rearward end of the adapter, a ball and stud having the stud protruded through the opening and secured to the adapter, a ball receiving hitch on the towed vehicle engaging said ball, a right side elongated coupling secured at one end to the right side of the towed vehicle and crossing the hitch and connected at the other end to the left side of the towing vehicle, and a left side elongated coupling secured at one end to the left side of the towed vehicle and crossing the hitch and connected at the other end to the right side of the towing vehicle, and a carrier comprising;

a base having a stud receiving opening, said stud inserted into the opening and thereby secured to the adapter; and an elongated support member fixedly attached to said base and having its ends laterally extended from each side thereof and forming left and right end loops, said ends configured into a loop, and said elongated couplings secured in said loops with the left coupling received in the right end loop and the right coupling received in the left end loop to insure that the crossing of the couplings is rearward of the ball and stud.

5. A carrier as defined in claim 4 wherein the couplings are flexible cables and the configured loops are helically formed to define a circle opening, the loops of the helix being spaced apart to permit the cable to be laterally inserted into the center opening and to permit sliding of the cable through the opening.

6. A carrier as defined in claim 5 wherein the couplings are chain lengths of interconnected chain links, the configured loops being open sided loops whereby selected chain links can be hooked onto the support ends.

* * * * *